A. H. NEUREUTHER.
AUTOMATIC PINION CUTTING MACHINE.
APPLICATION FILED OCT. 17, 1908.
953,753.
Patented Apr. 5, 1910.
4 SHEETS—SHEET 1.
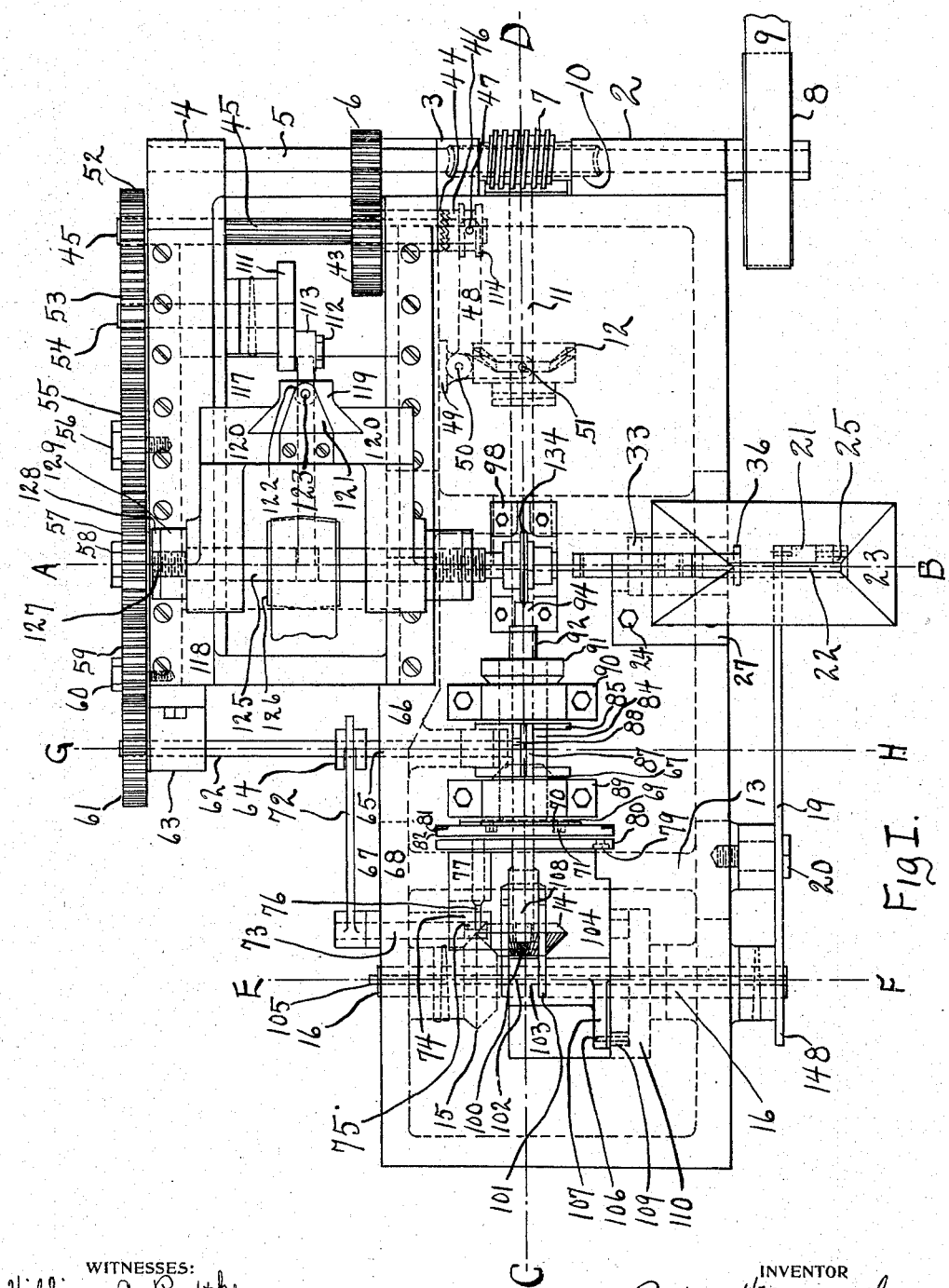
Fig I.
WITNESSES:
William A. Radtke.
Oscar W. Dauber.
INVENTOR
Andrew H. Neureuther.

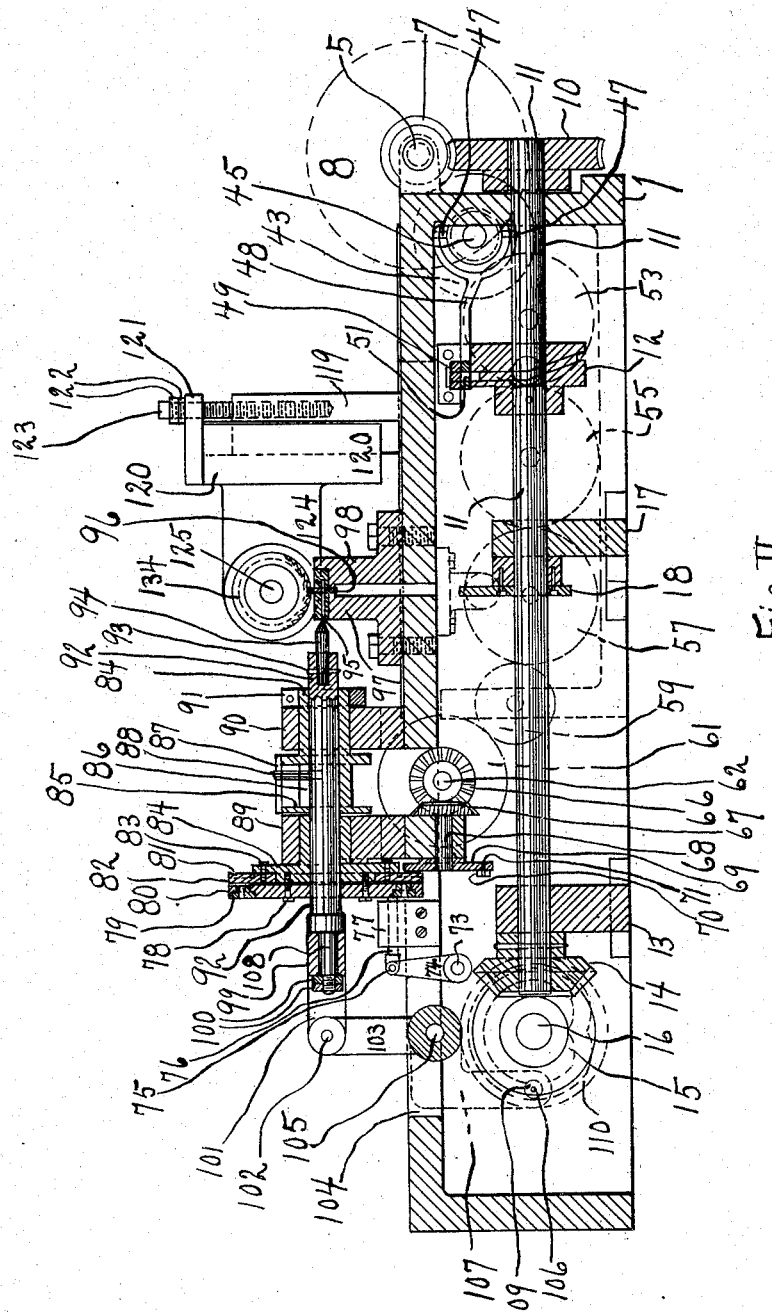

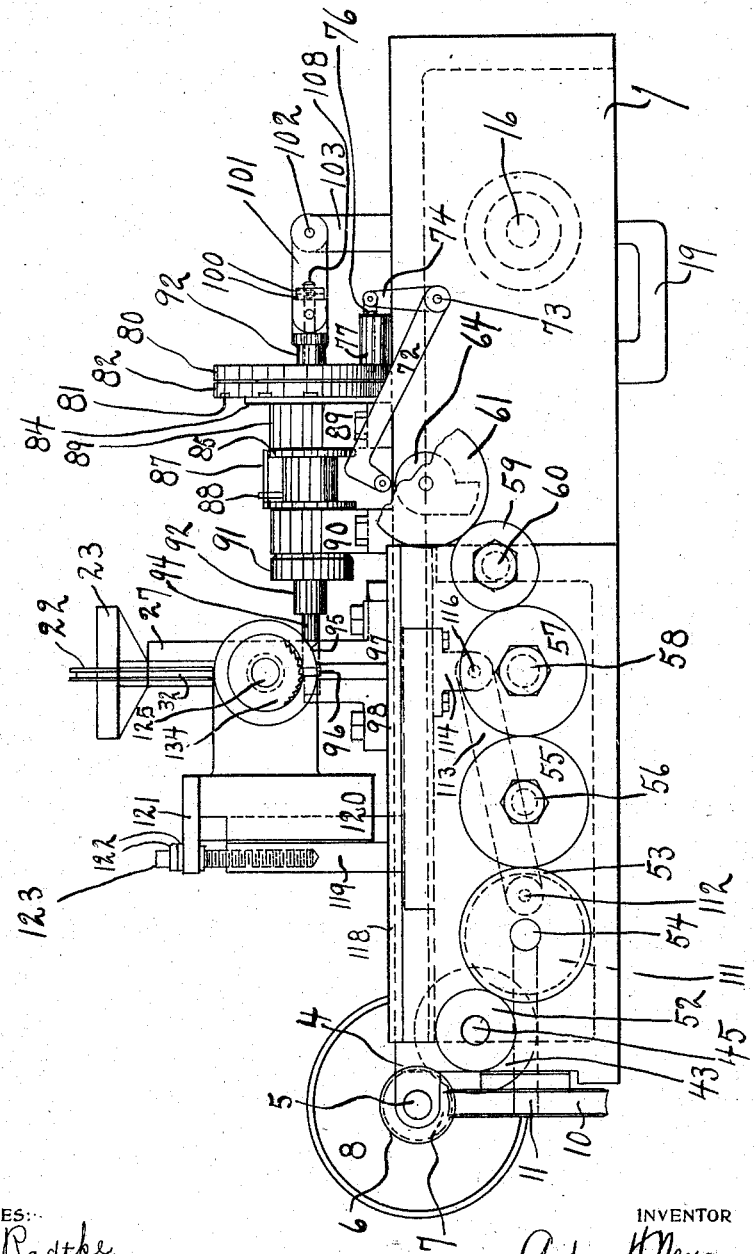

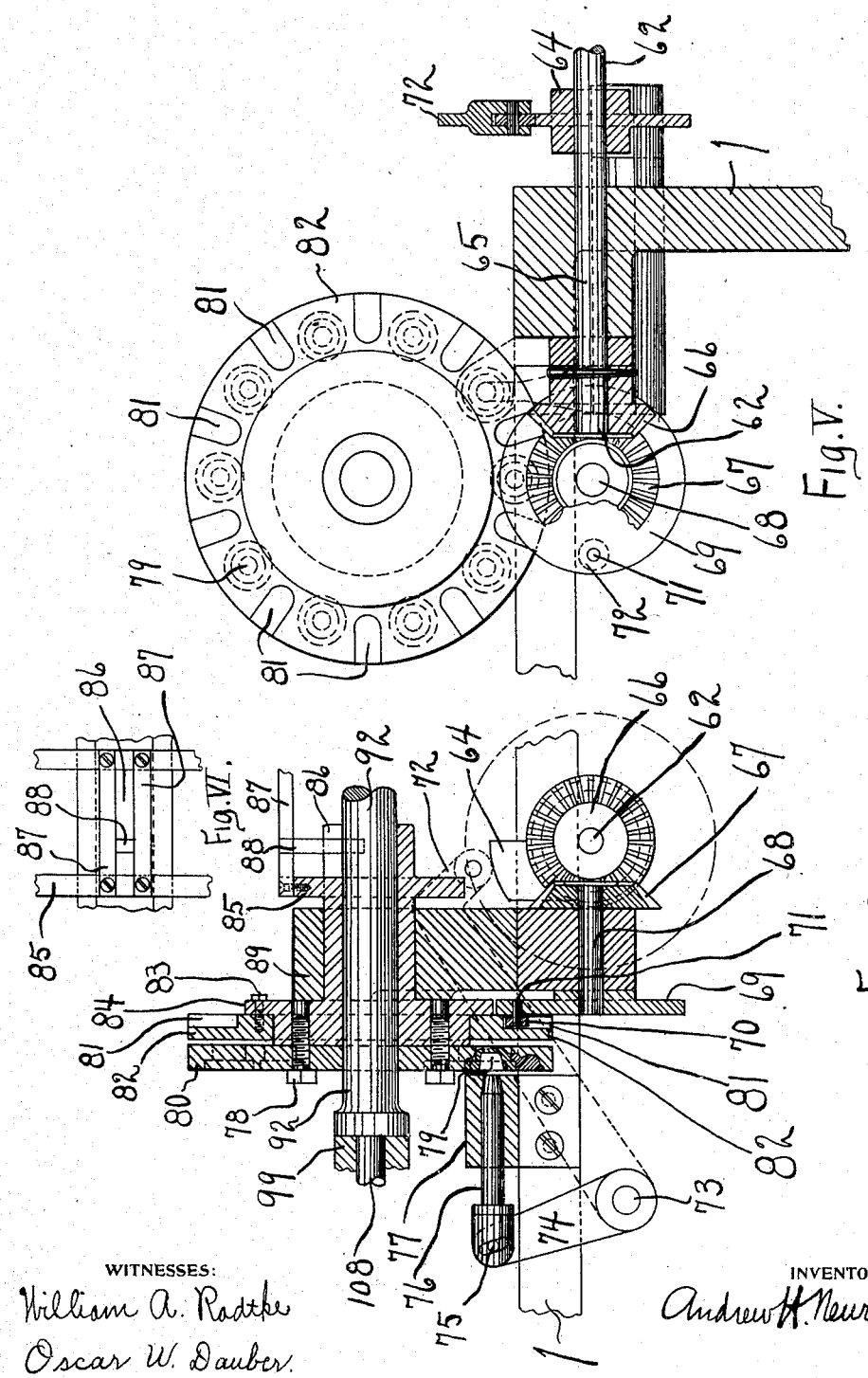

UNITED STATES PATENT OFFICE.

ANDREW H. NEUREUTHER, OF PERU, ILLINOIS, ASSIGNOR TO THE WESTERN CLOCK MANUFACTURING COMPANY, OF LA SALLE, ILLINOIS, A CORPORATION OF ILLINOIS.

AUTOMATIC PINION-CUTTING MACHINE.

953,753. Specification of Letters Patent. Patented Apr. 5, 1910.

Original application filed May 21, 1907, Serial No. 374,934. Divided and this application filed October 17, 1908. Serial No. 458,287.

*To all whom it may concern:*

Be it known that I, ANDREW H. NEUREUTHER, a citizen of the United States, residing at Peru, in the county of Lasalle and State of Illinois, have invented a new and useful Automatic Pinion-Cutting Machine, of which the following is a specification.

This application is a division of application No. 374,934, filed May 21st, 1907.

My invention relates to machines for cutting the teeth of pinions and gears and has for its object the production of a machine in which it is only necessary to dump any number of pinion blanks into a hopper, when they will be erected (righted), stacked, forced on to an arbor, operated upon and the blank again released and conducted from the machine.

My invention further relates to the specific means and devices which will be hereinafter described, shown and claimed.

I attain these objects by the mechanism illustrated in the accompanying drawings, in which—

Figure 1 is a top view of my automatic pinion cutting machine. Fig. 2 is a vertical sectional view along the line C D of Fig. 1. Fig. 3 is a left-hand side view. Fig. 4 is an enlarged vertical sectional view through the arbor showing how it is slidably connected with the indexing mechanism and showing method of indexing and locking the arbor. Fig. 5 is a front view of Fig. 4 showing actuating shaft and index locking cam in section. Fig. 6 is a top view of the part of Fig. 4 showing the construction of the sliding connection between the arbor and the indexing mechanism.

In the drawing, 1 represents the frame of my machine, 2, 3 and 4 are bearings in the frame 1 which journal the shaft 5 by means of which the entire driving mechanism of the machine is driven by means of pulley 8 and belt 9. Rigidly fastened to shaft 5 is a worm 7, which engages a worm wheel 10 which is rigidly fastened to a shaft 11, which is journaled in the front end of the frame 1 and in bracket bearings 13 and 17 fastened to the frame of the machine. Shaft 11 terminates with a bevel gear 14 which engages with a bevel gear 15 which is rigidly mounted on a shaft 16 which is journaled in the frame of the machine as shown. Shaft 16 carries cams 110 and 148, both rigidly fastened to it by means of the pins shown. Cam 110 has a groove which carries a roll 109 which is journaled on a pin 106 which is rigidly fastened to a lever 107, which is journaled on a pin 105 mounted in the frame of the machine (see Fig. 3). The upper end of lever 107 terminates in a projection 103, which has an aperture through which passes a pin 102. On this pin 102 are journaled two links 101 whose other ends have apertures which are journaled on pins projecting from the collar 99, also journaled on the projecting part 108 of arbor 92. Nuts 100 retain said collar 99 in its proper position as shown. From this it is seen that cam 110 controls the longitudinal motion and position of arbor 92, causing it to remain stationary or to reciprocate, depending on the form of the groove in cam 110. Guideway 32 has a notch cut out of its upper edge so that the rotating cutter 134 can cut the blank 96 and has openings on each side which permit the small staking end 95 of staking arbor 94, which is fastened to above mentioned reciprocating arbor 92, to pass through said guide or runway and said pinion into the bearing or standard 98, which is rigidly fastened to the frame. The upper part of said tube contains a combined blank gaging and releasing mechanism.

The arbor 92 as above mentioned has an intermittent reciprocating motion, moving forward when forcing on a blank against the standard 98, in which the end 95 of arbor 92 is journaled, and backward into the standard 98 in which it is also journaled, thereby releasing the blank from the arbor end 95.

It is evident from the manner in which crank plate 69 is connected with shaft 62 that it rotates in unison with it. As crank plate 69 rotates, the roll 70 (see Figs. 4 and 5) engages and enters into the radial slots 81 in the periphery of the motion plate 82 (as shown in Fig. 4) and carries said plate 82 through a partial rotation, depending on the number of slots in said motion plate. The number of said slots 81 in the motion plate 82 is equal to the number of teeth to be cut in the pinion, said slots being equally spaced as shown in Fig. 5. Motion plate 82 is fastened to a shouldered sleeve 84 by means of bolts 83 (see Figs. 2 and 4).

Sleeve 84 is journaled in standards 90 and 89, each of which is fastened to the frame 1.

91 is a split nut on sleeve 84 by means of which it can be adjusted so that the end motion can be taken up.

In back of motion plate 82 and fastened to shouldered sleeve 84 by means of bolts 78, is the index or locking plate 80, which carries the same number of equally spaced tapered bushings 79 as there are slots 81 in the motion plate 82. Said index plate 80 with its tapered bushings 79 serves as a means for locking the shouldered sleeve 84 between each successive rotation of same by the crank plate roller 70 and the slots 81 in motion plate 80. Said locking is accomplished by means of the index pin 76, which is journaled in a standard 77 which is fastened to the frame 1 (see Fig. 4). Index pin 76 has one end tapered, which permits it to fall into the tapered bushing 79 to index plate 80 even though the centers of pin and hole are not exactly in line. The other end of index pin 76 is pivotally connected to a lever 74 by means of pin 75. Lever 74 is fastened to a shaft 73 journaled in the frame 1. The outer end of shaft 73 is fastened to a lever 72 whose other end carries a roll journaled on a pin fastened in the lever, said roll engaging with the above mentioned cam 64, which is fastened to shaft 62. The cam 64 is so shaped and timed in relation with roll 70 on crank plate 69, that it pulls index pin 76 just before roll 70 enters the slot 81 in motion plate 82 and again permits index pin 76 to pass into one of the tapered bushings 79, thereby locking shouldered sleeve 84 just as roll 70 leaves the slot 81 after partially rotating the shouldered sleeve 84. It will be well to note that the sliding member 117 is so timed with reference to the locking of the shouldered sleeve 84, that it permits the rotating cutter 134 to pass through the blank 96 while the shouldered sleeve is locked by index pin 76 as above explained.

The arbor 92 is journaled in the axial opening of the shouldered sleeve 84 and slidably connected with it by means of a pin 88 fastened to arbor 92, the upper end of pin 88 passing through a slot 86 between the shoulders 85 of said sleeve and operates between the hardened plates 87 (see Fig. 6), which are fastened on the shoulders 85 of sleeve 84. By means of the pin 88 and the plates 87, any side wear can be readily taken up, and this arrangement of keeping the bearing point considerably out from the axis eliminates or reduces the error of inaccuracy of the fitting of plates and pin as you go toward the axis, making it possible to have considerable back lash between pin and plates before it will be noticeable in the teeth cut on blank 96.

From the above description it is evident that arbor 92 can have a longitudinal motion in the shouldered sleeve 84 and also that the rotary motion and the locking of this sleeve 84 will also be imparted to the said arbor 92 of auxiliary arbor 94, which is fastened to arbor 92 by means of pin 93.

It will be understood, of course, that the various portions of my machine could be used with the others or in connection with features greatly modified. It will also be understood that cams and arrangements of levers and other such operating parts could be greatly modified without departing from the spirit of my invention. In short, I do not wish to be understood as limiting myself to one particular form, arrangement and grouping of these several features, elements or parts; but I have presented here that form of machine which I am now using, with the intention of having it taken in a sense diagrammatic or descriptive of that class of machines which could be produced and any one of which would contain the substance of all or most of my invention.

I claim:

1. In an automatic pinion cutting machine, an arbor slidably mounted in a shouldered sleeve journaled in the frame of the machine, two staking abutments in the path of said arbor and means for intermittently reciprocating said arbor through one and into the other of said abutments.

2. In an automatic pinion cutting machine, a frame, a sleeve rotatably mounted in said frame, a pair of shoulders on said sleeve, a pair of parallel plates fastened on said shoulders, an arbor slidably mounted in said sleeve and a pin fastened in said arbor and projecting therefrom through the space between said plates.

3. In an automatic pinion cutting machine, a frame, a sleeve journaled in said frame, a plurality of shoulders formed on said sleeve, an axial aperture in said sleeve, a radially disposed aperture connecting the space between said shoulders with the axial aperture, two parallel plates adjustably fastened on said shoulders, an arbor slidably mounted in the axial aperture by means of a pin fastened in the arbor which passes through the radially disposed aperture and between said plates, substantially as shown and described.

4. In an automatic pinion cutting machine, a frame, a shouldered sleeve journaled in said frame, an arbor concentrically mounted in said sleeve and slidably connected therewith by means of a pin fastened in said arbor, and a pair of parallel plates fastened on the shoulders of said sleeve, substantially as shown and described.

ANDREW H. NEUREUTHER.

Witnesses:
OSCAR W. DAUBER,
WILLIAM A. RADTKE.